(12) United States Patent
Oh et al.

(10) Patent No.: US 9,048,489 B2
(45) Date of Patent: Jun. 2, 2015

(54) ELECTRODE ASSEMBLY AND LITHIUM SECONDARY BATTERY USING THE SAME

(75) Inventors: Jeongwon Oh, Yongin-si (KR); Joongheon Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 666 days.

(21) Appl. No.: 12/487,966

(22) Filed: Jun. 19, 2009

(65) Prior Publication Data

US 2010/0035144 A1 Feb. 11, 2010

(30) Foreign Application Priority Data

Jun. 23, 2008 (KR) .................. 2008-59128

(51) Int. Cl.
| | |
|---|---|
| H01M 10/02 | (2006.01) |
| H01M 4/02 | (2006.01) |
| H01M 2/02 | (2006.01) |
| H01M 2/26 | (2006.01) |
| H01M 10/04 | (2006.01) |
| H01M 10/0587 | (2010.01) |
| H01M 2/16 | (2006.01) |
| H01M 10/0525 | (2010.01) |

(52) U.S. Cl.
CPC ............ H01M 2/263 (2013.01); *H01M 2/1673* (2013.01); *H01M 2/168* (2013.01); H01M 2/021 (2013.01); H01M 2/0212 (2013.01); H01M 10/0431 (2013.01); *H01M 10/0525* (2013.01); H01M 10/0587 (2013.01); *Y02E 60/122* (2013.01)

(58) Field of Classification Search
CPC ............... H01M 2/1673; H01M 2/168
USPC ................... 429/164, 211, 129, 246
See application file for complete search history.

(56) References Cited

U.S. PATENT DOCUMENTS

| | | | |
|---|---|---|---|
| 6,887,616 B2 * | 5/2005 | Kim et al. ................. | 429/94 |
| 2001/0033962 A1 * | 10/2001 | Suzuki ....................... | 429/94 |
| 2005/0069764 A1 | 3/2005 | Kodama et al. | |
| 2005/0277018 A1 | 12/2005 | Kim | |
| 2005/0277021 A1 | 12/2005 | Kozuki et al. | |
| 2006/0147793 A1 * | 7/2006 | Kim et al. ................. | 429/94 |
| 2006/0154139 A1 * | 7/2006 | Fujikawa et al. ........... | 429/130 |
| 2006/0154145 A1 | 7/2006 | Lee | |
| 2007/0231701 A1 | 10/2007 | Lee | |
| 2009/0246639 A1 | 10/2009 | Kim | |

FOREIGN PATENT DOCUMENTS

| | | |
|---|---|---|
| CN | 2645251 Y | 9/2004 |
| CN | 1753204 A | 3/2006 |
| EP | 1 562 241 | 8/2005 |
| EP | 1 641 057 | 3/2006 |
| JP | 2002-093404 A | 3/2002 |
| JP | 2005-340178 A | 12/2005 |
| JP | 2005-353520 A | 12/2005 |
| KR | 10-2006-0028184 | 3/2006 |
| KR | 10-2006-0037846 | 5/2006 |
| KR | 10-2007-0097149 | 10/2007 |

OTHER PUBLICATIONS

Korean Notice of Allowance dated Dec. 2, 2010 issued for Korean Patent Application No. KR 10-2008-0059128 corresponding to the captioned application.

Chinese Office Action dated Feb. 17, 2011 for Chinese Application No. CN 200910150449.5 corresponding to Korean Application No. KR 10-2008-0059128 which corresponds to the captioned application.

Japanese Office Action dated Apr. 3, 2012 for Japanese Patent Application No. JP 2009-148347 which shares priority of Korean Patent Application No. KR 10-2008-0059128 with captioned U.S. Appl. No. 12/487,966.

\* cited by examiner

*Primary Examiner* — Ladan Mohaddes

(74) *Attorney, Agent, or Firm* — Knobbe Martens Olson & Bear LLP

(57) ABSTRACT

An electrode assembly and a lithium secondary battery including the same. Heat generation of the electrode tabs is reduced by providing the electrode tabs at the outermost parts of the electrode assembly. An insulation member is attached at the boundary of the electrode tabs and the respective electrode plates. An insulation member is also attached to the uncoated portions formed on the outer circumference of the electrode assembly, thereby preventing internal short circuits either between an uncoated portion and an active material layer or between the uncoated portions. The electrode assembly can be used in pouch, rectangular and cylindrical lithium secondary batteries to prevent an internal short circuit within the batteries.

6 Claims, 4 Drawing Sheets

ELECTRODE ASSEMBLY AND LITHIUM SECONDARY BATTERY USING THE SAME

CROSS-REFERENCE TO RELATED APPLICATION

This application claims the benefit of Korean Application No. 2008-59128, filed on Jun. 23, 2008 in the Korean Intellectual Property Office, the disclosure of which is incorporated herein by reference.

BACKGROUND OF THE INVENTION

1. Field of the Invention

Aspects of the present invention relate to a secondary battery, and more particularly, to an electrode assembly and a lithium secondary battery using the same.

2. Description of the Related Art

Generally, a secondary battery is a battery that can be repeatedly charged and discharged, differently from a disposable battery that is not rechargeable. Secondary batteries have been widely used for advanced electronic devices such as cellular phones, notebook computers and camcorders.

In particular, lithium secondary batteries are developing rapidly because they have an operating voltage of 3.6 V that is three times more than a nickel-cadmium battery or a nickel-hydrogen battery, and they have high energy density per unit weight. Lithium secondary batteries use lithium group oxides as a cathode active material, and carbon materials as an anode active material. Depending on the kind of electrolyte, lithium secondary batteries are divided into liquid electrolyte batteries and polymer electrolyte batteries. Batteries using liquid electrolyte are called lithium ion batteries and batteries using a polymer electrolyte are called lithium polymer batteries. In addition, lithium secondary batteries are classified according to the shape of their cases into cylindrical, angular and pouch types.

An electrode assembly is provided inside the case of a lithium secondary battery. The electrode assembly is formed by interposing a separator between cathode and anode plates and winding all three together. The cathode and anode plates are formed of a collector and an active material layer coated on at least one surface of the collector. Both ends of the collector include uncoated portions where the active material layer is not formed. Usually, electrode tabs are provided at the uncoated portions.

Usually, at the portions of the battery where the electrode tabs are welded to the electrode plates, metals of different composition are electrically coupled to each other, that is, the metals of the electrode plates and the metals of the electrode tabs. Accordingly, the internal resistance (IR) of those portions increases and significant heat is generated. Therefore, protective tapes are attached to protect the portions where the electrode plates and electrode tabs are electrically coupled to each other.

In addition, insulation tape is attached to the boundaries between the electrode tab installation portions, the active material layers and the uncoated portions. The insulation tape attached to the boundaries between the active material layers and uncoated portions prevents short circuits that could be caused by contact between the electrode plates or the tab for one electrode plate and the other electrode plate.

However, the protective tape or insulation tape is attached only to a partial region of an electrode plate. Meanwhile, the separator insulating the electrode plates from each other contracts from the internal heat generated by a nearby electrode tab. Thus, the uncoated portion of the one electrode plate without the insulation tape and the active material layer of the other electrode plate become electrically coupled to each other, thereby causing an internal short circuit of the battery. In addition, the internal short circuit of the battery may occur by contact between the uncoated portions of the two electrode plates. The internal short circuit may cause accidents such as fire or explosion of the battery thus adversely affecting the reliability of the battery.

SUMMARY OF THE INVENTION

An aspect of the present invention provides an electrode assembly and a lithium secondary battery using the same that can prevent an electrode tab from becoming overheated or burning because of overcharge/overdischarge. Another aspect of the present invention provides an electrode assembly and a lithium secondary battery using the same that can prevent an internal short circuit that could be caused by contact between an uncoated portion of an electrode plate and the active material layer of the other electrode plate when the separator between them is compressed. Still another aspect of the present invention provides an electrode assembly and a lithium secondary battery using the same that can prevent an internal short circuit that could be caused by contact between uncoated portions of electrode plates when the separator between them is compressed In more detail, one aspect of the present invention provides an electrode assembly that includes: a first electrode plate having uncoated portions on both ends of a collector that are not coated with active material; a second electrode plate having uncoated portions on both ends of a collector that are not coated with active material; a separator interposed between the first and second electrode plates; a first electrode tab provided at the outermost part of the first electrode plate; and a second electrode tab provided at the outermost part of the second electrode plate. The first and second electrode tabs may be respectively provided at rear uncoated portions of the first and second electrode plates that are arranged at the outermost parts of the electrode assembly when the electrode assembly is wound.

An insulation member may be attached to at least one surface of the rear uncoated portion at the outermost part of the first electrode plate. That is, the insulation member may be attached to an inner surface of the rear uncoated portion of the first electrode plate that faces an outer surface of the rear uncoated portion of the second electrode plate. The insulation member may instead be attached to an outer surface of the rear uncoated portion of the first electrode plate that faces an inner surface of the rear uncoated portion of the second electrode plate.

The insulation member may also be attached to at least one surface of the front uncoated portion of the first electrode plate. The insulation member may also be attached to both surfaces of the front uncoated portion of the first electrode plate.

The insulation member may be an insulation tape. The insulation member may be a laminating tape attached to a boundary portion between the active material layer and uncoated portion of the electrode tab.

The first electrode plate may be a cathode plate. The second electrode plate may be an anode plate.

Another aspect of the present invention provides a lithium secondary battery comprising the above electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
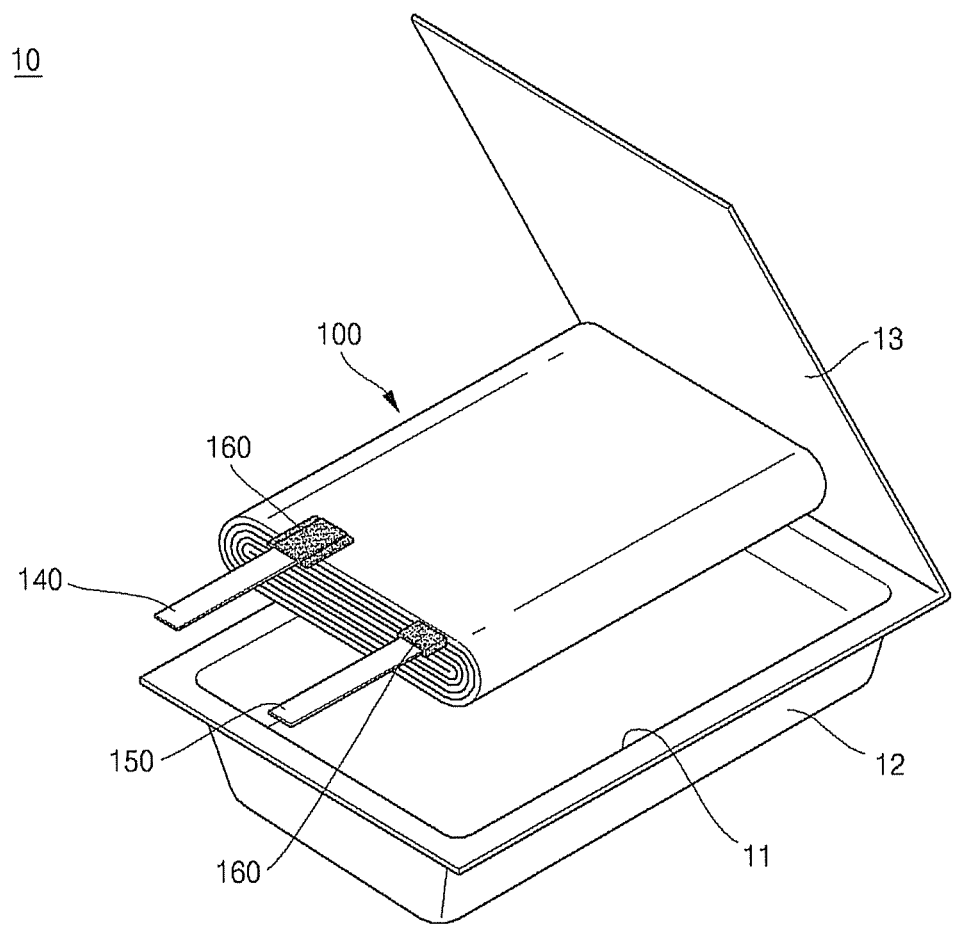
FIG. 1 is an exploded perspective view illustrating a pouch type lithium secondary battery using an electrode assembly according to an example embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 3:
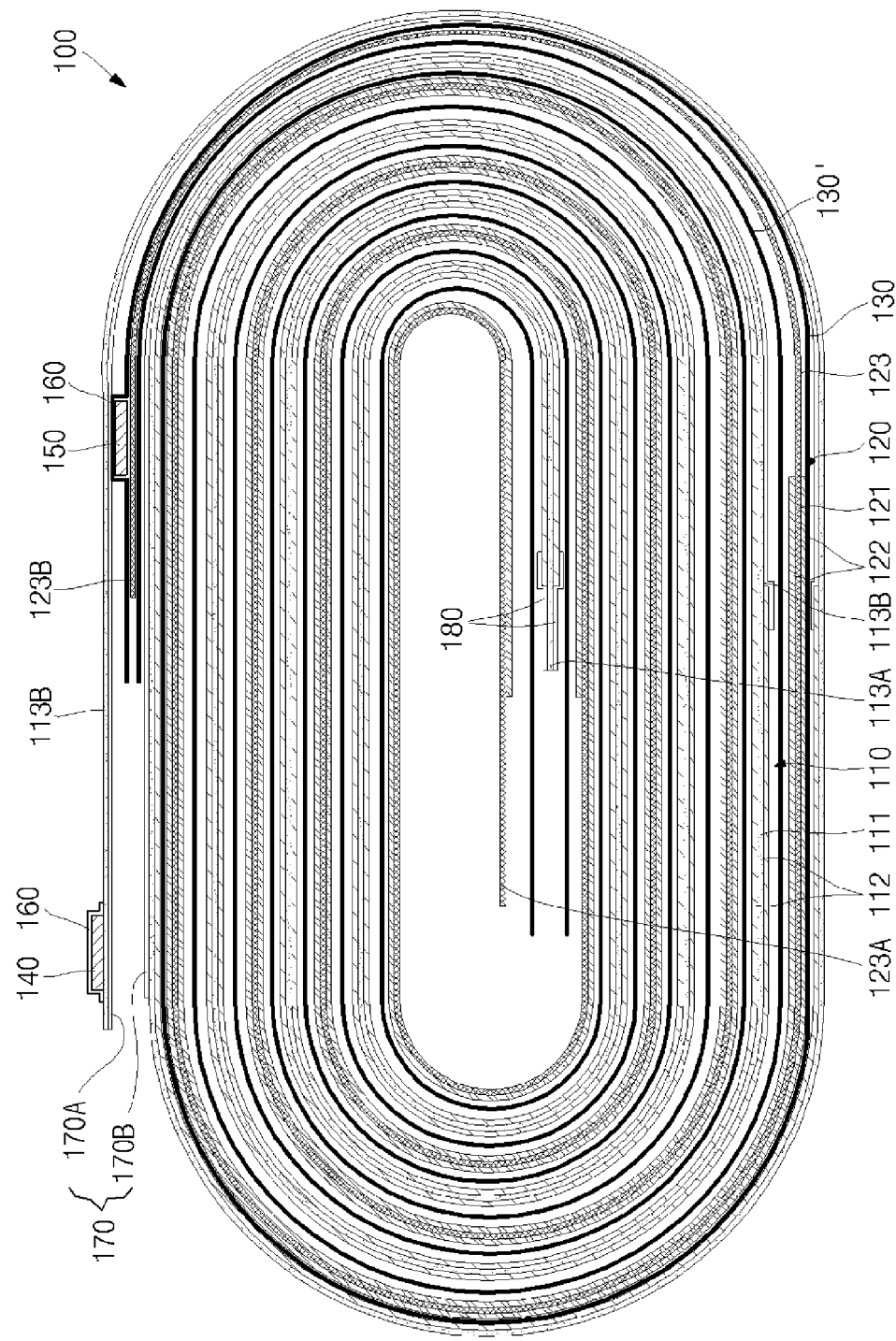
FIG. 3 is a cross sectional view illustrating an electrode assembly.
Figure 4:
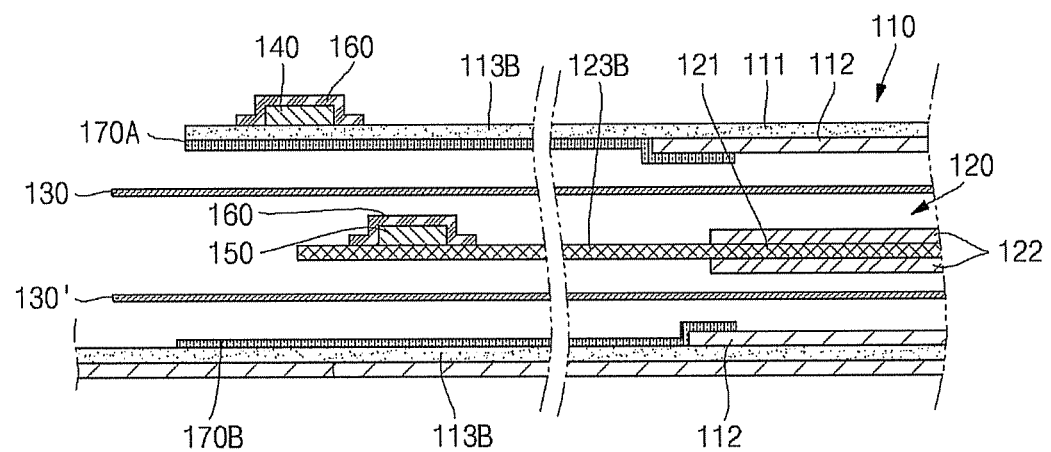
FIG. 4 is a schematic view illustrating the attachment of a laminating tape insulation member to the electrode assembly of FIG. 3.

Referring at first to FIGS. 3 and 4, an electrode assembly 100 according to an example embodiment of the present invention includes a cathode plate 110, an anode plate 120 and a separator 130. The electrode assembly 100 is formed by interposing the separator 130 between the cathode plate 110 and anode plate 120 and winding the three together in jelly-roll fashion.

The cathode plate 110 includes a cathode collector 111 made of thin aluminum foil and a cathode active material layer 112 containing lithium oxide as a main component coated on both surfaces of the cathode collector 111. In addition, uncoated cathode portions 113 are respectively formed on both ends of the cathode collector 111, where the uncoated cathode portions 113 refer to regions where the cathode active material layer 112 is not coated on the cathode collector 111. Now, referring to FIGS. 1 and 2 as well, a cathode tab 140 is fixed to an uncoated cathode portion 113 by ultra-sonic welding and an end of the cathode tab 140 is fixed on the upper face or end of the wound cathode collector 111 in such a way as to project outward from the electrode assembly 100 and the cathode collector 111. The cathode tab 140 is usually made of nickel, a nickel alloy or other metals.

The anode plate 120 includes an anode collector 121 made of thin copper (Cu) foil and an anode active material layer 122 containing carbon material as a main component coated on both surfaces of the anode collector 121. In addition, uncoated anode portions 123 are also formed respectively on both ends of the anode collector 121, where the uncoated anode portions refer to regions where the anode active material layer 122 is not coated on the anode collector 121. An anode tab 150 is fixed to the uncoated anode portion 123 by ultra-sonic welding and an end of the anode tab 150 is fixed on the upper face or end of the wound anode collector 121 in such a way as to project outward from the electrode assembly 100 and the anode collector 121. The anode tab 150 is usually made of nickel, nickel alloy or other metals.

The separator 130 is interposed between the cathode plate 120 and anode plate 130 to prevent a short circuit between the plates. The separator 130 is made of polyethylene, polypropylene, or composite film thereof, but the material is not limited thereto. The separator 130 is wider than the cathode and anode plates 110 and 120. Thus, the separator 130 projects out beyond the cathode and anode plates, 110 and 120, respectively.

In addition, the electrode assembly 100 uses an insulation tape as an insulation member. A protective tape 160 or laminating tape 170 or 180 is used as the insulation tape. The insulation tape may be made of any material if it is an insulating material having a high stability to electrolytes or lithium ions. In particular, the insulation tape may be made of any one resin selected from a group of fluorinated resins such as polytetrafluoroethylene (PTFE), tetrafluoroethylene-hexafluoroethylene copolymer (FEP), tetrafluoroethylene-ethylene copolymer (ETFE), tetrafluoroethylene-perfluoro-alkylvinylether copolymer (PFA), or polyvinylidene fluoride (PVDF); polyimide, liquid crystal polymer (LCP), polyphenylene sulfide (PPS), polybutylene terephthalate (PBT), polyethylene terephthalate (PET), polyethylene (PE), polypropylene (PP), polyvinyl chloride (PVC) and poly-acetate resin.

The protective tape 160 is attached to surround the outer surfaces of the areas where the cathode and anode electrode tabs 140 and 150 are welded to the cathode and anode electrode plates 110 and 120. Accordingly, the protective tape 160 prevents the separator 130 from being damaged by the cathode and anode electrode tabs 140 and 150 that project from the cathode and anode electrode plates 110 and 120.

The laminating tapes 170 and 180 are attached to the starting and ending portions of the cathode and anode active material layers 112 and 122 and the laminating tapes 170 and 180 are formed on both surfaces of the cathode and anode collectors 111 and 121 that are the underlying materials. Accordingly, the laminating tapes 170 and 180 prevent the separator 130 from being damaged at the starting and ending portions of the cathode and anode active material layers 112 and 122 where the separator 130 projects beyond the uncoated cathode and anode portions 113 and 123 when the cathode and anode active material layers 112 and 122 are coated.

In the electrode assembly 100, uncoated cathode and anode portions 113 and 123 are formed at both ends of the cathode and anode plates 110 and 120 when the cathode plate 110, separator 130 and anode plate 120 are wound together in the jelly-roll fashion. In the uncoated cathode and anode portions 113 and 123, the uncoated portions at the winding start position are referred to as "front uncoated cathode or anode portions 113A or 123A" and the uncoated portions at the winding end position are referred to as "rear uncoated cathode or anode portions 113B or 123B".

For convenience, the portions provided with the fronts of the cathode and anode plates 110 and 120 are also defined as inner circumference parts of the electrode assembly, and the portions provided with the rears of the cathode and anode plates 110 and 120 are also defined as outer circumference parts of the electrode assembly. The cathode and anode tabs 140 and 150 are provided at the outer circumference part of the electrode assembly 100. The cathode tab 140 is welded to the rear cathode uncoated portion 113B and the protective tape 160 is attached to the cathode tab 140. The anode tab 150 is welded to the rear anode uncoated portion 123B and the protective tape 160 is attached to the anode tab 150.

In addition, an insulation member is attached to the inner surface of the rear cathode uncoated portion 113B of the cathode plate 110. The insulation member is a laminating tape 170A that is attached to the boundary between the cathode active material layer 112 and the rear cathode uncoated portion 113B. The laminating tape 170A extends to the end of the rear cathode uncoated portion 113B. Accordingly, the laminating tape 170A of the cathode plate 110 corresponds to the outer surface of the rear anode uncoated portion 123B of the anode plate 120 with the separator 130 interposed between them.

In addition, an insulation member is attached to the outer surface of the cathode plate 110 corresponding to the inner surface of the rear anode uncoated portion 123B of the anode plate 120. The insulation member is a laminating tape 170B that is attached to the boundary of the rear cathode uncoated portion 113B of the cathode plate 110. The laminating tape 170B extends to the end of the rear cathode uncoated portion 113B. Accordingly, the laminating tape 170B corresponds to the inner surface of the rear anode uncoated portion 123B of the anode plate 120 with the separator 130' interposed between them at the rear cathode uncoated portion 113B of the cathode plate 110.

In the cathode and anode plates 110 and 120 or cathode and anode uncoated portions 113B and 123B, the "outer surface" refers to a surface facing the outside of the electrode assembly, and the "inner surface" refers to a surface facing the inside of the electrode assembly. On the other hand, the laminating tape 180 may be further attached to both surfaces of the front cathode uncoated portion 113A of the cathode plate 110 in the inner circumference part of the electrode assembly 100. The laminating tape 180 prevents contact between the anode active material layer 122 and front anode uncoated portion 123A of the anode plate 120.

Operation of the electrode assembly having the above construction will be explained below. The cathode and anode tabs 140 and 150 are provided at the outer circumference of the electrode assembly 100. In other words, the cathode tab 140 is ultrasonically welded to the outermost part of the cathode plate 110 and then the protective tape 160 is attached thereto and the anode tab 150 is ultrasonically welded to the outermost part of the anode plate 120 and then the protection tape 160 is attached thereto. The cathode and anode tabs 140 and 150 are located at the outermost part of the electrode assembly 100 and thus less heat is concentrated at the cathode and anode tabs 140 and 150 during charge or discharge. Thus, an internal short circuit between the cathode and anode plates 110 and 120 that could be caused by heat of the cathode and anode tabs 140 and 150 can be prevented. As described above, heat radiation performance of the cathode and anode tabs 140 and 150 located at the outermost part of the electrode assembly 100 is improved compared to the situation where the electrode tab is located on the inner circumference of the electrode assembly 100.

In addition, the laminating tape 170A is extended and attached to the end of the rear cathode uncoated portion 113B of the cathode plate 110 on the inner surface of the rear cathode uncoated portion 113B of the cathode plate 110. Accordingly, the laminating tape 170A of the cathode plate 110 corresponds to the outer surface of the rear anode uncoated portion 123B of the anode plate 120 with the separator 130 interposed between them. Therefore, a short circuit that could be caused by contact between the rear cathode uncoated portion 113B of the cathode plate 110 and rear anode uncoated portion 123B of the anode does not occur even if the separator 130 interposed between the cathode and anode plates 110 and 120 is damaged or contracts. Further, a short circuit that could be caused by contact between the rear cathode uncoated portion 113B of the cathode plate 110 and the anode active material layer 122 of the anode plate does not occur. In particular, it is possible to prevent fatal damage to the battery that otherwise could be caused by contact between the cathode uncoated portion 113B of the cathode plate 110 and the anode active material layer 122 of the anode plate 120.

In addition, the laminating tape 170B is attached to the outer surface of the rear cathode uncoated portion 113B of the cathode plate 110 with the separator 130' interposed between them while the laminating tape 170B corresponds to the inner surface of the rear anode uncoated portion 123B of the anode plate 120. Accordingly, a short circuit that could be caused by contact between the rear anode uncoated portion 123B of the anode plate 120 and rear cathode uncoated portion 113B of the cathode plate 110 does not occur even if the separator 130' interposed between the cathode and anode plates 110 and 120 is damaged or contracts. Further, a short circuit that could be caused by contact between the rear anode uncoated portion 123B of the anode plate 120 and the cathode active material layer 112 of the cathode plate 110 does not occur. In particular, it is possible to prevent an internal short circuit that could be caused by contact between the rear anode uncoated portion 123B of the anode plate 120 and the cathode active material layer 112 of the cathode plate 110. As described above, in the electrode assembly 100, the cathode and anode tabs 140 and 150 of the cathode and anode plates 110 and 120 are located at the outermost part of the electrode assembly 100, thereby minimizing internal short circuits that could be caused by heat generation at the electrode tabs.

In addition, when the separator 130 or 130' is damaged or contracts, the rear anode uncoated portion 123B of the anode plate 120 is insulated from the rear cathode uncoated portion 113B or cathode active material layer 112 of the cathode plate 110, thereby preventing an internal short circuit within the battery. Thus, a short circuit that could occur at the outer circumference of the electrode assembly 100 can be completely prevented. In addition, both surfaces of the front cathode uncoated portion 113A of the cathode plate 110 are insulated by the laminating tape 180. Accordingly, a short circuit that could occur between the front cathode uncoated portion 113A and front anode uncoated portion 123A or anode active material layer 122 can also be prevented.

The insulation members 160, 170 and 180 of the electrode assembly 100 prevent a short circuit that could occur between the cathode and anode tabs 140 and 150, and completely prevent both a short circuit that could occur between the cathode non-coating portions 113A or 113B of the cathode plate 110 and anode active material layer 122 of the anode plate 120 and a short circuit that could occur between anode uncoated portions 123A and 123B of the anode plate 120 and cathode active material layer 112 of the cathode plate 110. In addition, the electrode assembly 100 prevents both a short circuit between a pouch (reference number 10, below) and the cathode and anode tabs 140 and 150 as well as a short circuit between the uncoated portion and active material layer of the electrode plate when the electrode assembly 100 is received in the pouch and sealed.

Figure 2:
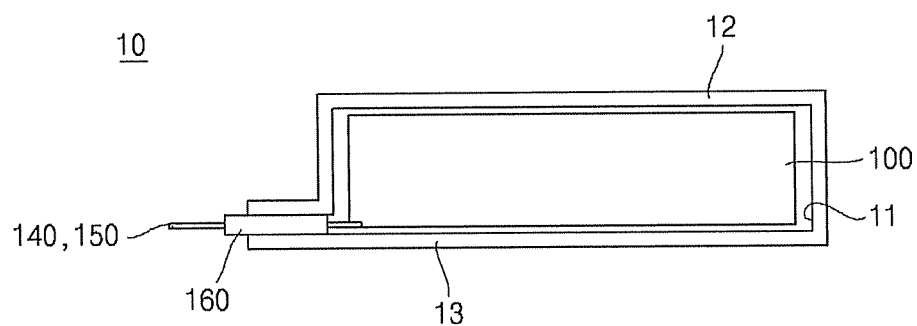
FIG. 2 is a sectional view illustrating the state of the lithium secondary battery of FIG. 1.

A pouch type lithium secondary battery using the above electrode assembly 100 will be explained below. FIGS. 1 and 2 show the above electrode assembly 100 and the pouch type lithium secondary battery 10 that in operation contains an electrolyte (the electrolyte is not described herein). The pouch type lithium secondary battery 10 includes a first case 12 having inner space 11 for seating the electrode assembly 100 therein and a second case 13 for sealing the first case 12.

The first and second cases 12 and 13 of the pouch type lithium secondary battery 10 have a structure (not shown) in which, in order, an insulation layer, a metal layer and a protective layer are stacked. The insulation layer is the innermost layer and has insulating and thermal adhesive properties. The metal layer prevents permeation of water and loss of electrolyte. The protective layer is the outermost layer and protects the body of the battery. However, the specific material and shape of the pouch are not limited to those discussed or shown.

The electrode assembly 100 having the above structure is received in the inner space 11 of the case 12. At this point, the cathode and anode tabs 140 and 150 of the electrode assembly 100 are drawn out of the first and second cases 12 and 13 that are subsequently sealed to each other. Electrolyte is injected after the electrode assembly 100 is received in the first case 12. Then, the first and second cases 12 and 13 are sealed by applying predetermined heat and pressure to the sealing surface along the periphery of the inner space 11, thereby completing the pouch type lithium secondary battery 10.

The pouch type lithium secondary battery 10 of this embodiment has the same advantages as the above described effects of the electrode assembly 100 of reducing heat generation at the cathode and anode tabs 140 and 150 and preventing a short circuit between the uncoated portion of one electrode plate and the active material layer of the other electrode plate or between uncoated portions of the electrode plates. In the above embodiments, the electrode assembly 100 is described for a pouch type lithium secondary battery 10, but is not limited thereto. The electrode assembly 100 can be also used in a rectangular or cylindrical lithium secondary battery.

As described above, the electrode assembly and lithium secondary battery comprising the same according to these aspects of the present invention produce the following effects. First, heat radiation performance is improved by providing the electrode tabs at the outermost parts of the electrode assembly, thereby preventing the electrode tabs from becoming overheated or burning because of overcharge/overdischarge. Second, the insulation member that is attached to the uncoated portion of the electrode plate that is wound at the outermost part of the electrode assembly prevents internal short circuits caused by contact between the uncoated portion of one electrode plate and the active material layer of the other electrode plate when the separator is compressed. Third, the insulation member that is attached to the uncoated portion of the electrode plate that is wound at the outermost part of the electrode assembly prevents internal short circuits that could be caused by contact between uncoated portions of the electrode plates when the separator is compressed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly, comprising:
   a first electrode plate having uncoated portions on each of a rear end and a front end of a collector where the collector is not coated with active material;
   a second electrode plate having uncoated portions on each of a rear end and a front end of a collector where the collector is not coated with active material;
   a separator interposed between the first and second electrode plates, wherein the first electrode, the separator, and the second electrode are wound around a central axis as a jelly-roll;
   a first electrode tab formed on an outer surface of the first electrode plate at an outermost portion of the jelly-roll with respect to the central axis;
   a second electrode tab formed on the second electrode plate at an outermost portion of the jelly-roll with respect to the central axis; and
   an insulation member attached to an inner surface of the uncoated portion of the first electrode plate that faces the separator, wherein a first end of the insulating member extends over a portion of the active material and a second end of the insulation member extends to the end of the uncoated portion of the first electrode plate.

2. The electrode assembly of claim 1, wherein the first and second electrode tabs are respectively provided at an uncoated portions of the first and second electrode plates.

3. The electrode assembly of claim 1, wherein the insulation member is an insulation tape, and wherein each of the first electrode tab and the second electrode tab are covered by a protective tape.

4. The electrode assembly of claim 1, wherein the insulation member comprises a laminating tape attached to a boundary between an active material layer and the uncoated portion of the first electrode plate, wherein the laminating tape extends beyond the first electrode tab.

5. The electrode assembly of claim 1, wherein the first electrode plate is a cathode plate.

6. The electrode assembly of claim 1, wherein the second electrode plate is an anode plate.

* * * * *